March 16, 1965 J. M. CUNNINGHAM 3,174,029

LEADER SHEET IDENTIFICATION

Filed Oct. 26, 1959

INVENTOR
JAMES M. CUNNINGHAM
BY Francis V. Giolma
ATTORNEY

United States Patent Office 3,174,029

Patented Mar. 16, 1965

3,174,029

LEADER SHEET IDENTIFICATION

James M. Cunningham, Endicott, N.Y., assignor to International Business Machines Corporation, New York, N.Y., a corporation of New York Filed Oct. 26, 1959, Ser. No. 848,580
4 Claims. (Cl. 235—61.7)

This invention relates generally to document reading, and it has reference in particular to apparatus and a method of leader sheet identification in document reading.

In the operation of a document-to-tape machine and especially where documents fed to such a machine come in groups or batches as in a census operation, it is customary to separate the different groups of documents by preceding each batch or group of documents with a leader sheet. This sheet may contain information relative to the entire batch, such as a group indication, numeration, district, etc., as well as trial balances for a district count.

It may be discovered after the documents for a group have been fed or partially fed through a machine that the entire group is generally unsatisfactory for some reason and requires special handling. Under this condition, it is necessary to remove from the tape all information written from the defective group. In order to do this, it is necessary to return to some specific point on the tape where recording of the defective group began. This must be a fail-safe point to which return can be made so that it is certain that the record up to this point is correct.

Should only a few documents in a group be defective, it may be desirable to allow the group to remain written on the tape but to indicate by proper coding in the detail document record that the record may be an error. It is evident that positive identification of a leader sheet or document may be written on the tape and that provision be made for writing an incorrect record from a detail sheet or document with option for refusing to write such a record.

It is therefore an object of this invention to provide a fail-safe method of identifying a leader sheet of a group of documents.

Another object of the invention is to provide in a document reading machine for positively identifying a leader sheet so as to preclude accidental marking of a detail document as a leader sheet.

Yet another object of the invention is to provide for marking of a leader sheet with a mark which will override any possible detail mark on the sheet.

Another object of the invention is to provide for recognizing leader sheets preceding each batch or group of documents from which information is being recorded on tape or the like.

It is also an object of this invention to provide for markings and reading the marks on leader and detail documents so that a leader document mark on a document prevents a detail mark although present from registering.

It is also an object of this invention to provide in a leader and detail document marking system for preventing failure of the mark scanning means from erroneously indicating a leader sheet as a detail document.

Yet another object of this invention is to provide apparatus of a fail-safe type for positively distinguishing leader documents from detail documents.

The foregoing and other objects, features and advantages of the invention will be apparent from the following more particular description of a preferred embodiment of the invention, as illustrated in the accompanying drawings.

Figure 1:
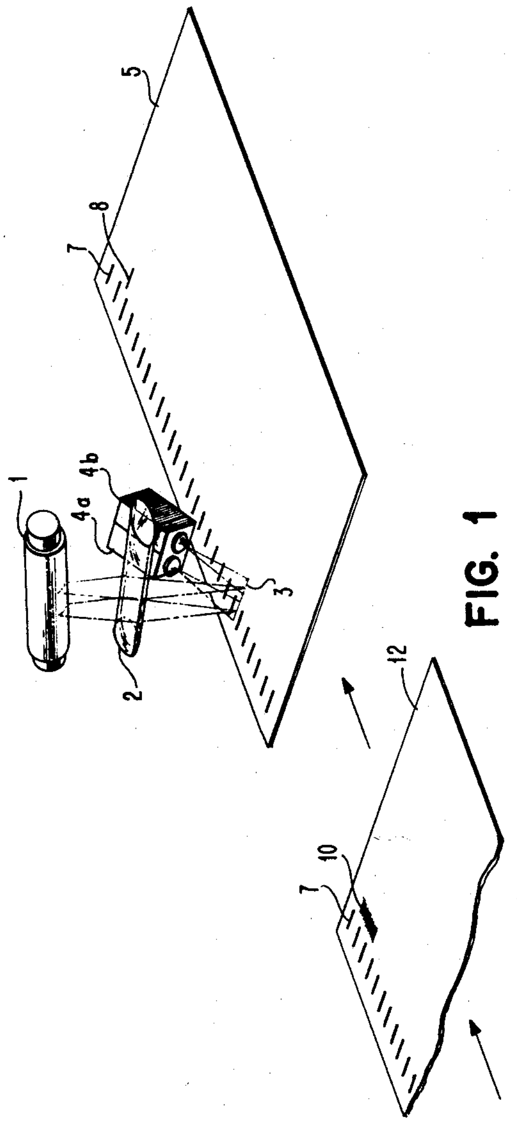
FIG. 1 is a partial schematic isometric view of document reading apparatus embodying the invention in one of its forms.

Referring to FIG. 1, it will be seen that an elongated source of light, such as a lamp 1, is utilized in connection with a substantially cylindrical lens 2 for projecting a line of light 3 on the surface of a document 5. The line of light 3 may be utilized in connection with a suitable shield or mask (not shown) which has suitable openings so as to limit the view of photosensitive devices 4*a* and 4*b* which observe individual segments of the line of light on the document.

The photosensitive devices 4*a* and 4*b* may be of any suitable type comprising either phototransistors as shown or solar cells. As the document 5 moves in the direction of the arrow, the photosensitive devices will sense changes in the intensity of the line of light based on the presence or absence of marks on the document. The photosensitive device 4*a* is arranged to view a plurality of spaced commutator marks 7 adjacent one edge of the document, while the photosensitive device 4*b* scans an adjacent column for detecting a detail mark 8 as shown on the documents 5 or a leader identification mark 10 as shown on the succeeding document 12. As shown, the detail identification mark comprises a line positioned adjacent the second commutator mark on the document 5, while the leader sheet identification mark 10 comprises a blotch or mark commencing before the second commutator mark 7 and extending beyond the location of and predominating over the detail mark 8 so as to completely preclude the recognition of a detail mark 8 should one also occur on the sheet 12.

Figure 2:
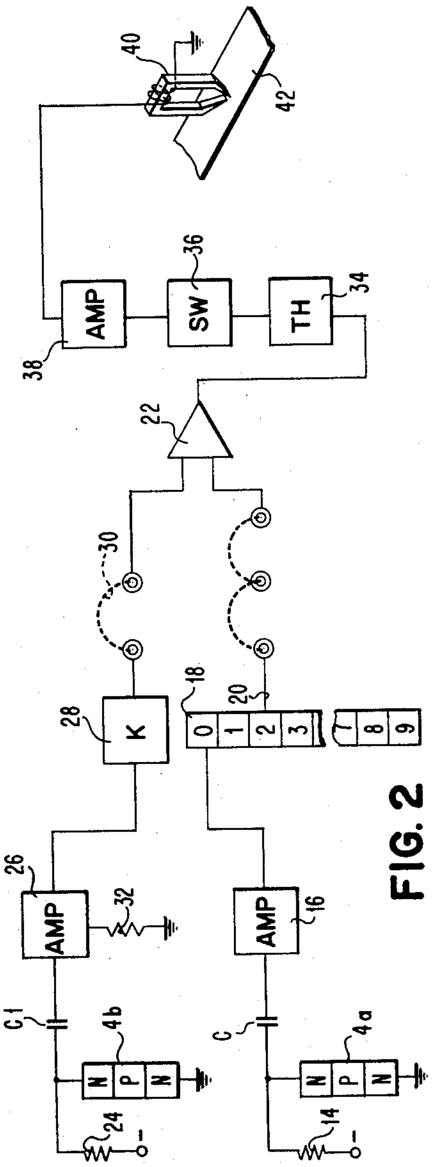
FIG. 2 is a schematic diagram of the leader and detail mark identification circuitry utilized in the invention with the apparatus of FIG. 1.

Referring to FIG. 2, it will be seen that the phototransistor 4*a* which observes the commutator mark 7 is of the NPN type (though it should be realized that the PNP type may also be used) and has its emitter connected through a suitable resistor 14 to the negative terminal of a suitable source of direct current. The collector is connected to the positive terminal. The end of the resistor 14 adjacent the phototransistor 4*a* is connected by means of a capacitor C to an inverter amplifier 16 to provide a positive pulse output when a mark is sensed for operating a ring counter 18 of any suitable type for counting the commutator marks 7. A connection is made to the ring counter 18 through a conductor 20 so as to apply an output pulse in response to sensing the second commutator mark to a coincidence or AND switch 22.

The phototransistor device 4*b* may also be of the NPN type having an emitter resistor 24 connecting it to the negative terminal of a suitable source, the emitter being connected through a capacitor C1 to the input side of an amplifier 26. The output of the amplifier is connected through a cathode follower 28 and conductor 30 to the other terminal of the AND switch 22. The time constant of the capacitor C1, the input resistor 32 of the amplifier 26, and the emitter resistor 24 is such that only a relatively short duration pulse or spike appears in response to sensing the leading edge of either a detail mark 8 or leader identification mark 10, this pulse being preferably of such short duration that it does not last from the leading edge of the leader identification mark 10 to the time when the second commutator mark 7 is sensed. The output of the coincidence switch 22 is connected to a suitable storage device, such as a thyratron 34, for storing an output indication from switch 22. Switch means of any suitable type well known in the art and designated by the numeral 36 may be used for applying the storage indication of the thyratron 34 at a predetermined time through an amplifier 38 to a suitable recording head 40 for recording an indication of the detail mark at a particular location on a magnetic tape or the like 42.

In operation, when the photosensitive device 4a senses the commutator marks 7 on the detail sheet 5, an output pulse is provided for each commutator mark, causing the ring counter 18 to count in a well-known manner. When the photosensitive device 4b scans the detail mark 8, a positive output of short duration is provided at the amplifier 26 which is applied to the coincidence switch 22 at the same time that the line 20 is up because of reading the second commutator mark. This provides an output from the switch 22, which is stored in the thyratron storage device 34. This storage signal may be utilized at a later time to suitably control the switch 36 for utilizing it to apply a mark by means of the recording head 40 to the tape 42 in a manner to indicate a detail document.

When the leader sheet or document 12 passes a sensing station, the photosensitive device 4a provides an output pulse for each commutator mark read. The output pulse from the first commutator mark occurs prior to sensing the leader identification mark 10 so that no coincidence is obtained at the switch 22. After the output pulse from the first commutator mark 7 has occurred and before the output pulse from the second commutator mark occurs, the photosensitive device 4b senses the leading edge of the leader identification mark 10, producing a relatively sharp output pulse from the amplifier 26. Since this pulse occurs in between the pulses from the first and second commutator marks, there is no coincidence and no output is obtained from the switch 22 at this time. By the time the photosensitive device 4a senses the second commutator mark so as to produce an output from the ring counter 18, the output pulse from the amplifier 26 is no longer available. Accordingly, no output is obtained from the switch 22 and nothing is stored in the thyratron storage device 34. Hence when the switch 36 is operated at a later predetermined time to indicate the nature of the document, the recording head 40 is not energized, and the absence of a mark on the tape at this predetermined point indicates a leader document. It will be realized that the presence or absence of the particular mark controlled by the operation of the recording head may be utilized either alone or in conjunction with other coded signals of a distinctive type, so as to obviate the mere failure to read a mark from resulting in identification of a leader document.

The above-described apparatus may be utilized in conjunction with suitable reliability checking apparatus, so as to verify the positive operation of the photosensing devices. It will be thus observed that in accordance with the teachings of the present invention a fail-safe method is provided for identifying a leader sheet and distinguishing it from the associated detail sheets. The invention also provides for identifying a leader document in such a manner as to preclude a leader document from being identified as a detail document, either by the possible occurrence of a detail document mark on the leader sheets or by any failure of the scanning apparatus.

While the invention has been particularly shown and described with reference to a preferred embodiment thereof, it will be understood by those skilled in the art that various changes in form and detail may be made therein without departing from the spirit and scope of the invention.

What is claimed is:

1. In apparatus for selectively distinguishing between detail and leader documents in seriatim, each of which has a plurality of spaced commutator marks in one column along one edge and which has, respectively, in another column a detail mark located in predetermined longitudinal relation to one of the commutator marks and a leader mark located in the detail mark column to commence ahead of the corresponding detail mark and extending well beyond such location so as to be superimposed on and completely obliterate any erroneously placed detail mark, a first photosensitive scanning means for producing a pulse signal for each commutator mark, a second photosensitive means scanning said detail and leader mark column for producing a pulse signal of shorter duration than the time between sensing the leader mark and the predetermined commutator mark for each mark sensed in said another column, counter means responsive to the signal from the first photosensitive means connected for producing an output signal for the predetermined commutator mark only, and switch means operable only in response to coincident signals from the counter means and the second photosensitive means for distinguishing between detail and leader documents.

2. In apparatus for selectively distinguishing between detail and leader documents, each having a plurality of spaced commutator marks along one edge and having adjacent thereto, respectively, in the same columnar location a detail mark located adjacent a predetermined one of the commutator marks and a leader mark larger than and having its leading edge positioned ahead of and its trailing edge positioned substantially after the corresponding detail mark and completely enveloping the area of such corresponding mark so as to preclude sensing an erroneously placed detail mark, a first photosensitive means for producing a pulse signal for each commutator mark, a counter operated by said signals connected for producing an output signal for the predetermined commutator mark only, a second photosensitive means for producing a signal in response to the leading edge of a detail or leader mark, circuit means controlling the signal from the second photosensitive means to provide a short duration pulse of less duration than the elapsed time between sensing the leading edge of the leader mark and sensing the predetermined commutator mark, and coincident switch means controlled by the counter means and the second photosensitive means operable only when the short duration pulse occurs during the output signal from the counter.

3. The method of selectively distinguishing between leader and detail documents comprising, providing each detail document with a characteristic identifying mark located in one column in a predetermined relation to a particular one of a plurality of spaced commutator marks in another column along an edge of the document, sensing such mark relative to the particular commutator mark to identify the detail document, and providing a dominating mark on the leader document so positioned in said one column as to have its leading edge located before the start of the corresponding detail mark and extending after the end of such mark to completely obliterate and prevent the possibility of a detail mark thereon being recognized.

4. In a method for selectively distinguishing between detail and leader documents the steps of, providing a detail mark on each detail document located in a column alongside and slightly ahead of a particular one of a plurality of commutator marks for substantially simultaneous sensing by photosensitive sensing means, and providing on each leader document a dominating leader mark at and upon the detail mark location and which commences ahead of the location corresponding to the detail mark and extends beyond such location so as to more than completely cover the area normally occupied by a detail mark in the direction of sensing and prevent identification by the sensing means of a detail mark at such location.

References Cited in the file of this patent

UNITED STATES PATENTS

| | | |
|---|---|---|
| 2,348,535 | Goodale | May 9, 1944 |
| 2,600,817 | Victoreen | June 17, 1952 |
| 2,942,778 | Broido | June 28, 1960 |
| 2,954,266 | Danielson | Sept. 27, 1960 |